（12）United States Patent
Fritz et al.

(10) Patent No.: US 8,270,667 B2
(45) Date of Patent: Sep. 18, 2012

(54) SYSTEM AND METHOD FOR WIND TURBINE INSPECTION

(75) Inventors: Peter James Fritz, Greenville, SC (US); Shu Ching Quek, Somerville, MA (US); Guiju Song, Shanghai (CN); Li Tao, Shanghai (CN); Xinjun Wan, Shanghai (CN); Raul Munoz Medina, Queretaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/245,097

(22) Filed: Sep. 26, 2011

(65) Prior Publication Data

US 2012/0076345 A1    Mar. 29, 2012

(30) Foreign Application Priority Data

Sep. 29, 2010    (CN) .......................... 2010 1 0512937

(51) Int. Cl.
 *G06K 9/00* (2006.01)
(52) U.S. Cl. ......... 382/100; 382/254; 382/312; D23/375
(58) Field of Classification Search .................. 382/100, 382/254, 312; D23/375
See application file for complete search history.

(56) References Cited

U.S. PATENT DOCUMENTS

| | | | | |
|---|---|---|---|---|
| 6,966,754 | B2 * | 11/2005 | Wobben | 416/61 |
| 2007/0290426 | A1 * | 12/2007 | Trede et al. | 269/1 |
| 2009/0153656 | A1 * | 6/2009 | Sharonova | 348/125 |
| 2009/0266160 | A1 * | 10/2009 | Jeffrey et al. | 73/455 |

FOREIGN PATENT DOCUMENTS

GB    2460861 A  * 12/2009

OTHER PUBLICATIONS

Modal-blades, Larsen et al. ISBN 87-550-2697-4 (Riso-R-1181), 2002, pp. 1-72.*
CleverFarm—wind farms, Giebel et al., ISBN 87-550-3292-3 (Riso-R-1444), 2004, pp. 1-57.*
Non-Destructive-camera, Beattie et al., AIAA 99-0046, May 27, 2010., pp. 1-8.*
Ultrasonic-container, Raisutis et al., ISSN 1392-2114 vol. 63, No. 3, 2008, pp. 28-32.*
Thermographic-blades., Meinlschmidt et al., ECNDT 2006-Tu.1.5.3, 2006, pp. 1-9.*
Non-structure, Puri et al. AAM.13-14.105, 2008, pp. 1-11.*
Modal-blades, Larsen et al. ISBN 87-550-2697-4 (Riso-R-1181 ), 2002, pp. 1-72.*
Structural-methods, Ciang et al., 0957-0233, 2008, pp. 1-20.*
O&M strategies—blades., Wallace et al., Renewable energy focus., May/Jun. 2009, pp. 36-41.*

* cited by examiner

*Primary Examiner* — Jayesh A Patel
(74) *Attorney, Agent, or Firm* — Dority & Manning, P.A.

(57) ABSTRACT

A system and method for inspecting a wind turbine for indications is disclosed. The method includes providing an inspection system spaced from the wind turbine, appraise a rotor blade of the wind turbine, and inspecting the rotor blade for indications. The inspection system includes an observation system and an inspection device, the observation system including an appraisal device and an automated scanning device, the appraisal device configured to provide an image of at least a portion of the rotor blade, the automated scanning device configured to rotate about at least one axis, shifting the image.

18 Claims, 4 Drawing Sheets

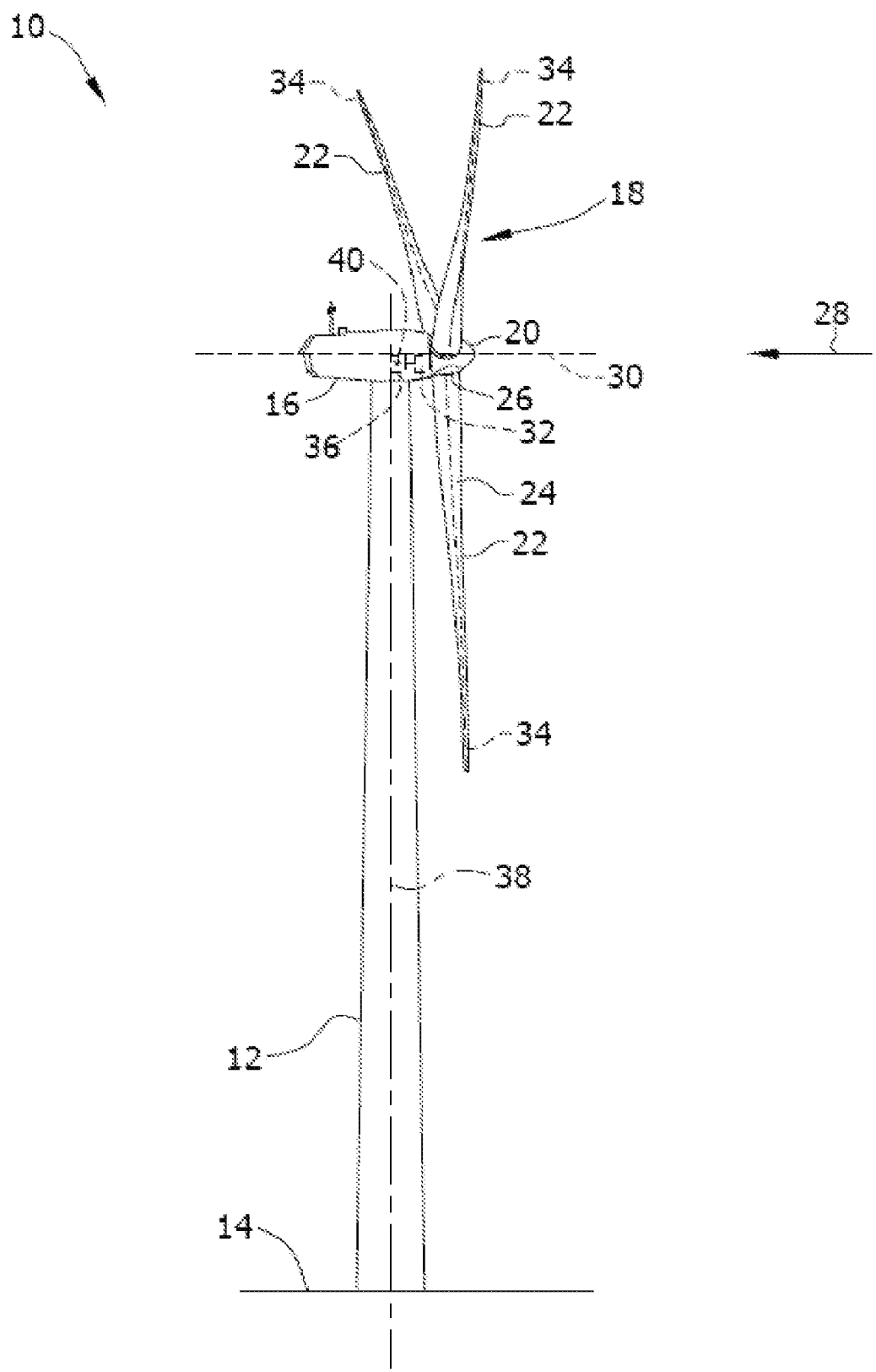
FIG. -1-

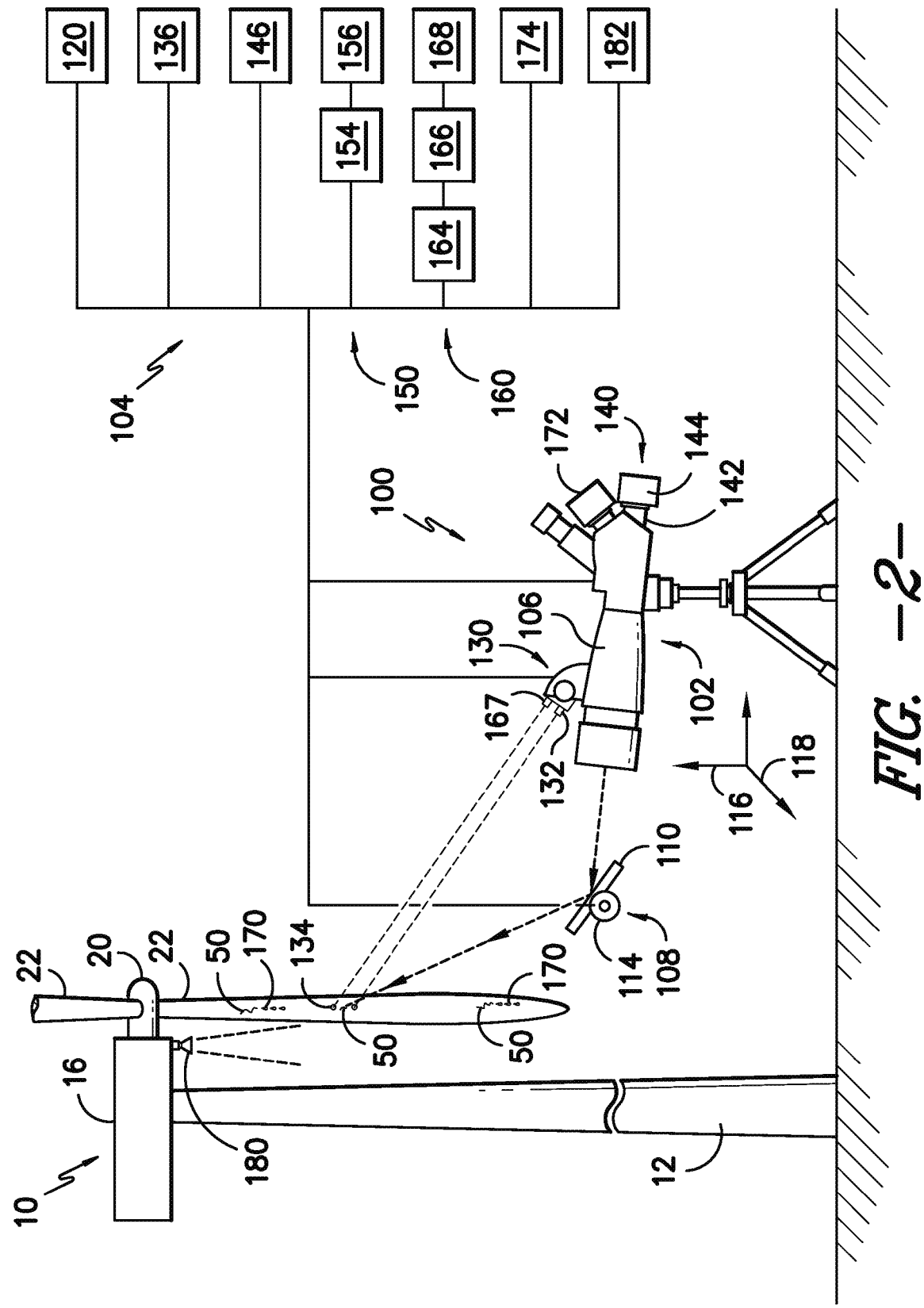
FIG. -2-

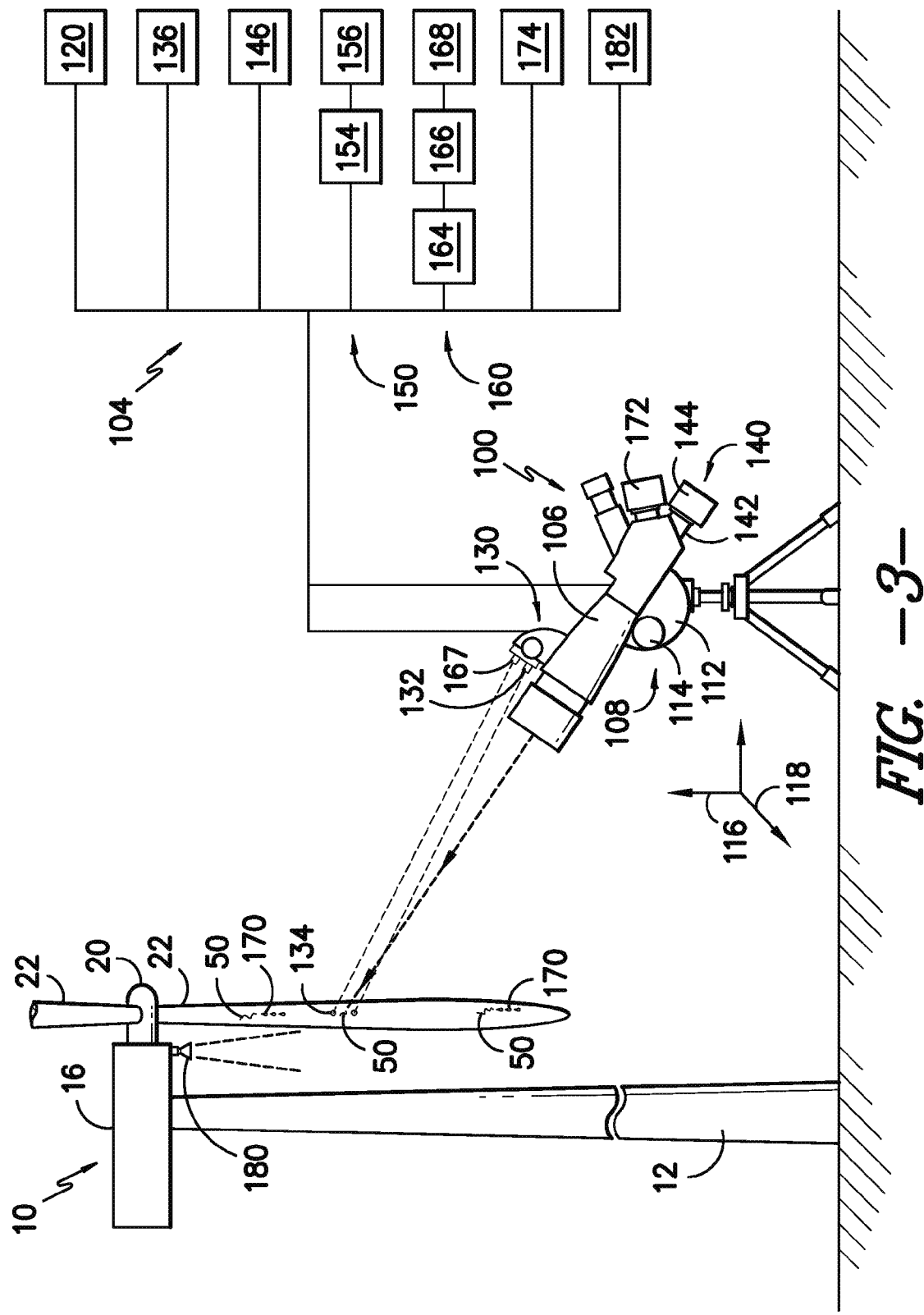
FIG. -3-

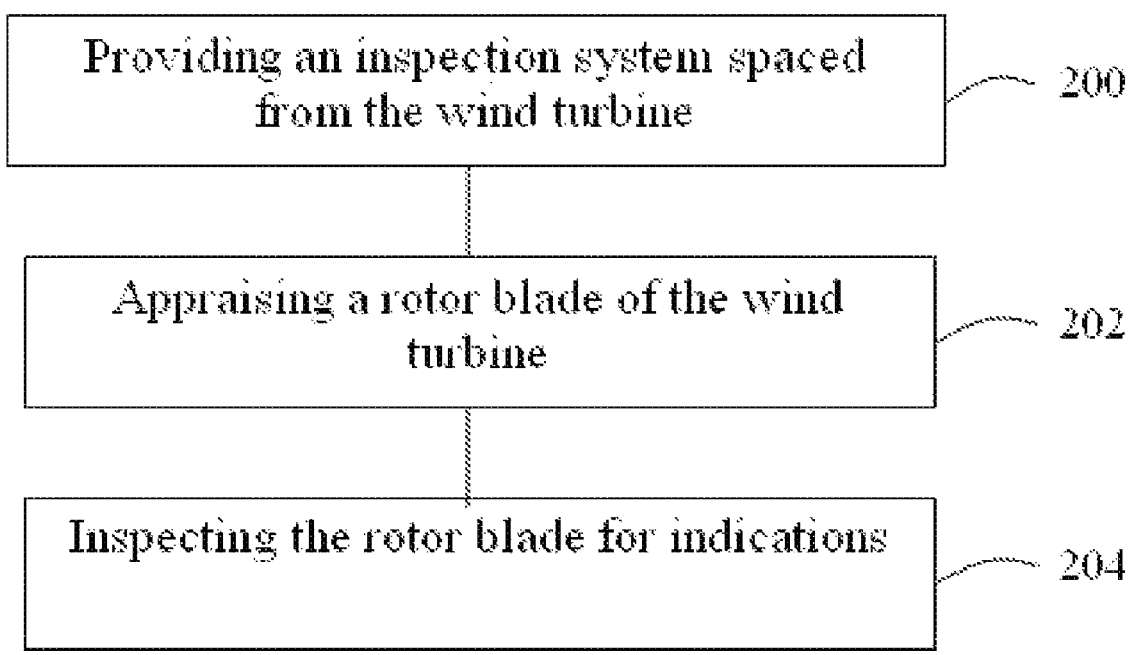
FIG. —4—

SYSTEM AND METHOD FOR WIND TURBINE INSPECTION

FIELD OF THE INVENTION

The present disclosure relates in general to wind turbines, and more particularly to systems and methods for inspecting wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The inspection of wind turbines, specifically of wind turbine rotor blades, is critical to the ongoing operation of wind turbines. Current systems and methods for inspecting wind turbines involve the use of telescopes to manually inspect the wind turbine rotor blades for cracks, erosion, fouling, or other potential defects, known as indications. Typically, an inspector will set up a telescope a certain distance from a wind turbine, and will manually use the telescope to visually inspect the wind turbine rotor blades for indications. Further, the inspector will be required to manually move the telescope to scan the rotor blades. This inspection process has a variety of disadvantages. For example, manually inspecting rotor blades from a distance subjects the process to human error, i.e., the inspector may fail to detect an indication, or the inspector may become disoriented, while inspecting the rotor blades and provide inaccurate information. Further, the manual inspection of rotor blades may only be performed during optimal environmental conditions. For example, a manual inspection of a wind turbine may not be performed during the night or when the weather is cloudy, rainy, or otherwise dissatisfactory, and may only be performed during daylight when there is proper incident light, rather than glare or shade. Thus, current systems and methods for wind turbine inspection are relatively inaccurate, slow, and inefficient.

Accordingly, there is a need for a system and method for inspection of a wind turbine that eliminates or reduces associated human errors. Additionally, an inspection system and method that can perform in a wide variety of environmental conditions would, be desired. Further, there is a need for a system and method for inspection of a wind turbine that are relatively fast and efficient.

BRIEF DESCRIPTION OF THE INVENTION

Aspects and advantages of the invention will be set forth in part in the following description, or may be obvious from the description, or may be learned through practice of the invention.

In one embodiment, a method for inspecting a wind turbine for indications is disclosed. The method includes providing an inspection system spaced from the wind turbine, appraising a rotor blade of the wind turbine, and inspecting the rotor blade for indications. The inspection system includes an observation system and an inspection device, the observation system including an appraisal device and an automated, scanning device, the appraisal device configured to provide an image of at least a portion of the rotor blade, the automated scanning device configured, to rotate about at least one axis, shifting the image.

In another embodiment, an inspection system for inspecting a wind turbine for indications is disclosed. The inspection system includes an observation system configured to appraise a rotor blade of the wind turbine, the observation system including an appraisal device and an automated scanning device, the appraisal device configured to provide an image of at least a portion of the rotor blade, the automated scanning device configured, to rotate about at least one axis, shifting the image. The inspection system further includes an inspection device connected to the observation system and configured to utilize the image to inspect the rotor blade for indications.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary wind turbine;

FIG. 2 is a side view of one embodiment of the inspection system of the present disclosure;

FIG. 3 is a side view of another embodiment of the inspection system of the present disclosure; and, FIG. 4 is a flow chart illustrating one embodiment of a method for inspecting a wind turbine for indications.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind, turbine 10 includes a tower 12 that extends from a support surface 14, such as the ground or a platform or foundation, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18, or a larger surface area of rotor blade 22 may be presented to the wind vectors, facilitating a stall of rotor 18.

In the exemplary embodiment, a blade pitch of each rotor blade 22 is controlled individually by a control system 36. Alternatively, the blade pitch for ail rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Referring now to FIGS. 2 and 3, the wind turbine 10 of the present disclosure may, during fabrication, assembly, operation, or otherwise, incur various indications 50. An indication 50 may be, for example, a crack, erosion, fouling, or other defect in the wind turbine 10, such as in a rotor blade 22, tower 12, or other component of the wind turbine 10. The indications 50, if not recognized and repaired, may damage the various components of the wind turbine 10 or cause them to fail. For example, indications 50 in high load areas of the rotor blades 22 may, in some instances, need to be repaired before growing past approximately 50 millimeters ("mm") in length, while indications 50 in low load areas of the rotor blades 22 may need to be repaired before growing past approximately 3 meters ("m") in length.

Thus, an inspection system 100 may be provided for inspecting the wind turbine 10 for indications 50. For example, the inspection system 100 may include an observation system 102 and an inspection device 104. The inspection system 100 may perform a variety of tasks to provide fast, efficient, accurate inspection of the wind turbine 10.

The observation system 102 may be configured to appraise the various components of a wind turbine 10, such as the rotor blades 22, the tower 12, or any other wind turbine 10 component. For example, the observation system 102 may be spaced and positioned at a distance from the wind turbine 10. In an exemplary embodiment, the observation system 102 may be disposed on the ground at a distance from the wind turbine 10. Alternatively, the observation, system 102 may be disposed, for example, in the bed of a truck or in any other suitable location spaced from the wind turbine 10.

The observation system 102 may include an appraisal device 106. The appraisal device 106 may be the component of the observation system 102 that appraises the various components of a wind turbine 10. The appraisal device 106 may provide a magnified view or image of the component of the wind turbine 10 being appraised, or at least a portion thereof, such that that component may be inspected for indications 50. For example, in exemplary embodiments, the appraisal device 106 may be a telescope, a spotting scope, or any other suitable magnifying device. Further, the appraisal device 106 may include any variety of suitable zoom and focus features. The zoom and focus features may be utilized to allow the views or images of the wind turbine 10 component being appraised to be manipulated for better inspection for indications 50.

The observation system 102 may further include an automated scanning device 108. The automated, scanning device 108 may be configured, to rotate about at least one axis, as discussed below. In general, the automated scanning device 108 may shift the view or image of the appraisal device 106 when the appraisal device 106 is appraising a wind turbine 10 component, thus allowing the appraisal device 106 to perform a complete appraisal of the wind turbine 10 component. In exemplary embodiments, for example, the automated scanning device 108 may shift the view or image of the appraisal device 106 while allowing the appraisal device 106 to remain stationary. In alternative exemplary embodiments, the automated scanning device 108 may shift the view or image of the appraisal device 106 by mechanically rotating and/or moving the appraisal device 106. The automated scanning device 108 may thus reduce or eliminate various errors associated with the manual movement of an appraisal device 106 to scan and appraise a wind turbine 10 component.

For example, in an exemplary embodiment, the automated scanning device 108 may be a reflection device 110. The reflection device 110 may be any device with a reflective surface or refractive volume, such as a mirror or a prism. The reflection device 110 may be disposed adjacent the appraisal device 106, and may be rotatable about at least one axis independently of the appraisal device 106. The reflection device 110 may reflect or refract an image of the wind turbine 10 component being appraised, and may provide this image to the appraisal device 106. Thus, in exemplary embodiments, the reflection device 110 may allow the appraisal device 106 to remain stationary during appraisal of a wind turbine 10 component. However, it should be understood that in alternative exemplary embodiments, the appraisal device 106 may move during appraisal of a wind turbine 10 component, such as by being mechanically rotated about one or more axes while the reflection device 110 rotates about other axes, as discussed below.

Alternatively, the automated scanning device 108 may be a mount 112. The mount 112 may be connected to the appraisal device 106, and may be rotatable about at least one axis, thus also rotating the appraisal device 106 about the at least one axis. Thus, in exemplary embodiments, the mount 112 may mechanically shift the view or image of the appraisal device 106, allowing the appraisal device 106 to appraise the wind turbine 10 components.

The automated scanning device 108, such as the reflection device 110 or the mount 112, may be configured to rotate about at least one axis. In general, rotation of the automated scanning device 108 may be mechanical, automated rotation. Further, rotation may be performed in incremental steps, or may be a smooth, continuous rotation from a desired starting point to a desired stopping point. For example, the automated scanning device 108 may include a motor 114 operable to mechanically rotate the automated scanning device 108 about at least one axis. The motor 114 may be any mechanical device suitable to move the automated scanning device 108.

In one exemplary embodiment, the automated scanning device 108 may be rotatable about a pan axis 116, such that the view of the appraisal device 106 may be panned as required to appraise the various wind turbine 10 components. In an alternative exemplary embodiment, the automated scanning device 108 may be rotatable about a tilt axis 118, such that the view of the appraisal device 106 may be tilted as required to appraise the various wind turbine 10 components. It should be understood that the rotation of the automated scanning device 108 about an axis is not limited to rotation about the pan axis 116 or the tilt axis 118, but may be rotation about any suitable axis as required to appraise the various wind turbine 10 components.

In exemplary embodiments, the automated scanning device 108 may be configured to rotate about two or more axes. For example, the motor 114 may be operable to mechanically rotate the automated, scanning device 108 about two or more axes, or the automated scanning device 108 may include more than one motor 114 for mechanically rotating the reflection device 110 about various axes. In an exemplary embodiment, for example, the automated scanning device 108 may be rotatable about both the pan axis 116 and the tilt axis 118.

The observation system 102 may farther include a processor 120 for operating the observation system 102. The observation system 102, such as the appraisal device 106, scanning device 108, and/or any other components or systems of the observation system 102, may be communicatively coupled to the processor 120. The communicative coupling of the various components of the observation system 102 and the processor 120 may be through a physical coupling, such as through a wire or other conduit or umbilical cord, or may be a wireless coupling, such as through an infra-red, cellular, sonic, optical, or radio frequency based coupling. The processor 120 may be incorporated into a suitable control system (not shown), such as a handheld remote, a personal digital assistant, cellular telephone, a separate pendant controller, or a computer. The observation system 102 may be operated manually through the processor 120 by a human operator, or may be partially or fully automated through the use of suitable programming logic incorporated into the processor 120.

The inspection device 104 may be connected to the observation system 102, and may be configured to inspect the wind turbine 10, such as the rotor blades 22 or any other wind turbine 10 components, such as the tower 12, for indications 50. Further, the inspection device 104 may, at least in part, utilize the images provided by the appraisal device 106 to inspect the wind turbine 10 or component thereof. For example, the inspection device 104 of the present disclosure may include any variety of components or systems for inspecting the wind turbine 10. In exemplary embodiments, the inspection device 104 may include a variety of apparatus configured to inspect the rotor blades 22. Further, the various components and systems of the inspection device 104, as discussed below, may be connected to and associated, with the observation system 102. Thus, for example, images or views of the wind turbine 10 component being appraised, may be communicated to the inspection device 104, such that the inspection device 104 may inspect the wind turbine 10 component for indications 50.

In an exemplary embodiment, the inspection device 104 may include, for example, a measuring apparatus 130. The measuring apparatus 130 may be configured to measure the size of any indications 50 detected on the wind, turbine 10, such as on a rotor blade 22. For example, the measuring apparatus 130 may include at least one laser 132 or a plurality of lasers 132. The lasers 132 may be directed at or proximate to indications 50 detected on the wind turbine 10, and may be utilized to measure the size of the indications 50. In an exemplary embodiment, the measuring apparatus 130 may include two lasers 132 disposed approximately parallel to each other. The lasers 132 may be calibrated such that the distance between the endpoints 134 of the lasers 132 is known. The lasers 132 may then be utilized to measure the size of the indications 50 by directing the lasers 132 at or proximate to the indications 50 and using the known distance between the endpoints 134 to scale and measure the size of the indications 50. The known distance between the endpoints 134 may be documented, such as in images of the indications 50 taken by the inspection device 104 as discussed below, such that the size of the indications 50 may be documented, verified, and recorded during or after the inspection of the wind turbine 10.

It should be understood that any number of lasers 132 may be utilized, and that if more than one laser 132 is utilized, the lasers 132 need not be disposed parallel each other, but may have any orientation relative to each other. Further, if should be understood that the measuring apparatus 130 need not include lasers 132, but rather may include any suitable measuring devices, such as any variety of light sources or indicators.

The measuring apparatus 130, and various components therein, may further include and be communicatively coupled to a processor 136 for operating the measuring apparatus 130. The communicative coupling of the measuring apparatus 130 and the processor 136 may be through a physical coupling, such as through a wire or other conduit or umbilical cord, or may be a wireless coupling, such as through an infra-red, cellular, sonic, optical, or radio frequency based coupling. The processor 136 may be incorporated into a suitable control system (not shown), such as a handheld remote, a personal digital assistant, cellular telephone, a separate pendant controller, or a computer. The measuring apparatus 130 may be operated manually through the processor 136 by a human operator, or may be partially or fully automated through the use of suitable programming logic incorporated into the processor 136. Further, the processor 136 may include suitable processing apparatus and software for performing the various calculations required by the measuring apparatus 130.

In an exemplary embodiment, the inspection device 104 may include, for example, a real time imaging apparatus 140. The real time imaging apparatus 140 may be configured to provide a real time image of the indications 50. For example, the real time imaging apparatus 140 may include a camera 142, such as a video camera, digital camera, analog camera, or other suitable imaging device. The camera 142 may be communicatively coupled to a receiver 144 through a physical coupling, such as through a wire or other conduit or umbilical cord, or through a wireless coupling, such as through an infra-red, cellular, sonic, optical, or radio frequency based coupling. The receiver 144 may be, for example, a computer, television, or other suitable screen, monitor, or device for displaying a picture or video. As the observation system 102 appraises the wind turbine 10, the camera 142 may provide real time images of the areas of the wind turbine 10, such as the portions of the rotor blade 22, being inspected. These real time images may be provided to the receiver 144, and may be viewed by human operators of the inspection system 100 and/or recorded. The real time images may be utilized by the human operators, or alternatively by detection software as discussed below, to detect indications 50.

The real time imaging apparatus 140, and various components therein, may further include and be communicatively coupled to a processor 146 for operating the real time imaging apparatus 140. The communicative coupling of the real time imaging apparatus 140 and the processor 146 may be through a physical coupling, such as through a wire or other conduit or umbilical cord, or may be a wireless coupling, such as through an infra-red, cellular, sonic, optical, or radio frequency based coupling. The processor 146 may be incorporated into a suitable control system (not shown), such as a handheld remote, a personal digital assistant, cellular telephone, a separate pendant controller, or a computer. The real time imaging apparatus 140 may be operated manually through the processor 146 by a human operator, or may be partially or fully automated through the use of suitable programming logic incorporated into the processor 146.

In an exemplary embodiment, the inspection device 104 may include, for example, a rasterization apparatus 150. The rasterization apparatus 150 may be configured to rasterize the wind turbine 10, such as the wind turbine 10 component being inspected, such as the rotor blade 22. For example, the rasterization apparatus 150 may be configured to capture images of the area of the wind turbine 10 being inspected and rasterize these images.

In an exemplary embodiment, the rasterization apparatus 150 may utilize the camera 142 to capture images of the area of the wind turbine 10 being inspected. Alternatively, the rasterization apparatus 150 may utilize a separate camera or other imaging device. The camera 142 or other camera or imaging device may be communicatively coupled to rasterization software 154 for rasterizing images of the area of the wind turbine 10 being inspected, such as the rotor blade 22. Any suitable rasterization software, such as any software that inputs images and outputs raster images or grids, may be utilized in rasterization apparatus 150. One example of suitable rasterization software 154 is RASTERVECT by RASTERVECT SOFTWARE.

The rasterization apparatus 150, and various components therein, may further include and be communicatively coupled, to a processor 156 for operating the rasterization apparatus 150. The communicative coupling of the rasterization apparatus 150 and the processor 156 may be through a physical coupling, such as through a wire or other conduit or umbilical cord, or may be a wireless coupling, such as through an infra-red, cellular, sonic, optical, or radio frequency based coupling. The processor 156 may be incorporated into a suitable control system (not shown), such as a handheld remote, a personal digital assistant, cellular telephone, a separate pendant controller, or a computer. The rasterization apparatus 150 may be operated manually through the processor 156 by a human operator, or may be partially or fully automated through the use of suitable programming logic incorporated into the processor 156.

In exemplary embodiments, the rasterization apparatus 150 may be communicatively coupled to the observation system 102, such that the rasterization apparatus 150 may control or direct the pattern in which the observation system 102 appraises the wind turbine 10 component being inspected, such as the rotor blade 22. For example, in one exemplary embodiment, the rasterization apparatus 150 may require that the observation system 102 appraise the tower 12 in a pattern such that the rasterization apparatus 150 begins documenting the suction side or the pressure side of a rotor blade 22 at the tip of the rotor blade 22, and then continues generally through the length of the rotor blade 22 to the hub of the rotor blade 22, recording at least a portion of the width of the rotor blade 22, and then continues back towards the tip by traveling through a line or point that defines the maximum chord width of the rotor blade 22, recording the remainder of the width of the rotor blade 22. In another embodiment, the rasterization apparatus 150 may require that the observation system 102 appraise the tower 12 in a pattern such that the rasterization apparatus 150 begins documenting the suction side or the pressure side of a rotor blade 22 at the tip or hub of the rotor blade 22 and then continues generally through the length of the rotor blade 22 to the other of the tip or hub, recording the entire width of the rotor blade 22 in a single sweep. In other embodiments, the rasterization apparatus 150 may document any portion of the rotor blade 22 utilizing any suitable rasterization pattern, including straight, curved, or zig-zig patterns.

In an exemplary embodiment, the inspection device 104 may include, for example, an imaging analysis apparatus 160. The imaging analysis apparatus 160 may be configured to capture images of the indications 50 and enhance the images of the indications 50. For example, the imaging analysis apparatus 160 may utilize the camera 142, or a separate camera or other imaging device, to capture images of indications 50 found during inspection of the wind turbine 10. The camera 142 or other camera or imaging device may be communicatively coupled to imaging analysis software 164 for enhancing the images. For example, the imaging analysis software 164 may be configured to lighten, darken, change the contrast, resolution, or color, magnify, or perform any variety of enhancements to the image, as is known in the art. Alternatively, the camera 142 or other camera or imaging device may capture a variety of images of each indication 50, and the images may be captured at various resolutions, contrasts, lightings, colors, and other adjustable imaging characteristics. The imaging analysis software 164 may be configured to combine the images to produce a suitable detailed image of the indication 50. One example of suitable imaging analysis software 164 is ADOBE PHOTOSHOP by ADOBE SYSTEMS INC.

In some exemplary embodiments, the imaging analysis apparatus 160 may be further configured to automatically detect the indications 50. For example, the camera 142 or other camera or imaging device may be communicatively coupled to machine vision software 166 for automatically detecting the indications 50. The machine vision software 166 may monitor the images being communicated through the camera 142 or other camera or imaging device, and may recognize indications 50 in the images. One example of suitable machine vision software 166 is ROBOREALM robotic machine vision software by ROBOREALM. The machine vision software 166, imaging analysis software 164, and camera 142 or other camera or suitable imaging device may further be communicatively coupled such that the machine vision software 166 is capable of directing the enhancement of images of indications 50 that are automatically detected.

In one embodiment, the imaging analysis apparatus 160, such as the machine vision software 166, may detect and utilize the contrast between various areas on the wind turbine 10 component being analyzed, such as between various areas on a rotor blade 22, to automatically detect the indications 50. For example, indications 50 on the wind turbine 10 component being analyzed may be discolored, or may reflect light differently, than the remainder of the wind turbine 10 component. Thus, there will be a contrast in the color and/or light reflected from the wind turbine 10 component in the area of the indication 50, and the imaging analysis apparatus 160 may detect and utilize this resulting contrast gradient. Additionally, the imaging analysis apparatus 160 may detect the duration and/or magnitude of a contrast gradient when the inspection device 104 is inspecting the wind turbine 10, and utilize this duration and/or magnitude to calculate the size of the indication 50. Further, contrast gradients may be utilized by the imaging analysis apparatus 160 to detect the outline, or silhouette, of the wind turbine 10 component being analyzed.

In another embodiment, the imaging analysis apparatus 160 may include at least one laser 167 or a plurality of lasers 167. The lasers 167 may be directed at the wind turbine 10 component being inspected, such as at a rotor blade 22, and may be utilized to automatically detect the indications 50. For example, the lasers 167 may be directed across the surface of the wind turbine 10 component being inspected. When the lasers 167 cross over indications 50 on the wind turbine 10 component being analyzed, the lasers 167 may be disturbed or altered by the indications 50. This disturbance or alteration may be detected or utilized by the imaging analysis apparatus 160. Additionally, the imaging analysis apparatus 160 may detect the duration of a disturbance or alteration when the inspection device 104 is inspecting the wind turbine 10, and utilize this duration to calculate the size of the indication 50. Further, disturbance or alterations may be utilized by the imaging analysis apparatus 160 to detect the outline, or silhouette, of the wind turbine 10 component being analyzed.

The imaging analysis apparatus 160, such as the machine vision software 166, may be communicatively coupled to the observation system 102. Thus, the machine vision software 166 may be capable of operating the observation system 102 to appraise the wind turbine 10 while the machine vision software 166 is operating to detect indications 50, and may be capable of operating the observation, system 102 to stop appraising, such as by stopping rotation about an axis, when an indication 50 is detected, such that images of the indication 50 may be captured and processed.

The imaging analysis apparatus 160 may further be configured, to perform comparative analysis of images of the indications 50. For example, the imaging analysis apparatus 160 may store images of the wind turbine 10, such as the rotor blade 22, during inspection of the wind turbine 10. During subsequent inspections of the wind turbine 10, the imaging analysis apparatus 160 may, upon obtaining current images of the wind turbine 10, compare the current images to previously stored images. Additionally, the imaging analysis apparatus 160 may, for example, indicate those indications 50 that are approaching designated limits. Further, the imaging analysis apparatus 160 may, for example, record changes and/or growth in indications 50 and further track the service capability of the wind turbine 10, such as the rotor blade 22, based on the indications 50. This comparative analysis may thus allow the imaging analysis apparatus 160 to, for example, detect the development of new indications 50 and/or track the growth of existing indications 50. The comparative analysis may in some embodiments be performed by the machine vision software 166, or may be performed by any other suitable components of the imaging analysis apparatus 160.

The imaging analysis apparatus 160, and various components therein, may further include and be communicatively coupled to a processor 168 for operating the imaging analysis apparatus 160. The communicative coupling of the imaging analysis apparatus 160 and the processor 168 may be through a physical coupling, such as through a wire or other conduit or umbilical cord, or may be a wireless coupling, such as through an infra-red, cellular, sonic, optical, or radio frequency based coupling. The processor 168 may be incorporated into a suitable control system (not shown), such as a handheld remote, a personal digital assistant, cellular telephone, a separate pendant controller, or a computer. The imaging analysis apparatus 160 may be operated manually through the processor 168 by a human operator, or may be partially or fully automated through the use of suitable programming logic incorporated into the processor 168.

In an exemplary embodiment, the inspection system 100 may include an inspection fluid 170. The inspection fluid 170 may be configured to be added to the wind turbine 10 component being inspected, such as to a rotor blade 22, to reveal indications 50. The inspection fluid 170 may be, for example, a gas or a liquid. In exemplary embodiments, the inspection fluid 170 may be steam, heated air, cold air, or smoke. It should be understood that the inspection fluid 170 is not limited to steam, heated air, cold air, or smoke, but may be any suitable gas or liquid for revealing indications 50. The inspection fluid 170 may reveal indications 50 by, for example, seeping through cracks, holes, or apertures in the wind turbine 10 component being inspected that are caused by the indications 50. For example, in an exemplary embodiment, inspection fluid 170 may be added to the inferior of, for example, a rotor blade 22. The inspection fluid 170 may seep through the rotor blade 22 from the interior to the exterior through any indications 50 that have resulted in cracks, holes, or apertures in the rotor blade 22.

The inspection device 104 may be configured to defect the inspection fluid 170, such as by detecting inspection fluid 170 seeping through the wind turbine 10 component being inspected. For example, the inspection device 104 may include an imaging device 172. The imaging device 172 may be configured to record images, in any suitable video or photographic format, of the wind turbine 10 component being inspected, such that the inspection fluid 170 seeping through the wind turbine 10 component is visible in the images. For example, the imaging device 172 may be any suitable device for recording visible images, infrared images, ultraviolet images, or spectral images.

The imaging device 172, and various components therein, may further include and be communicatively coupled to a processor 174 for operating the imaging device 172. The communicative coupling of the imaging device 172 and the processor 174 may be through a physical coupling, such as through a wire or other conduit or umbilical cord, or may be a wireless coupling, such as through an infra-red, cellular, sonic, optical, or radio frequency based coupling. The processor 174 may be incorporated into a suitable control system (not shown), such as a handheld remote, a personal digital assistant, cellular telephone, a separate pendant controller, or a computer. The imaging device 172 may be operated manually through the processor 174 by a human operator, or may be partially or fully automated through the use of suitable programming logic incorporated into the processor 174.

In exemplary embodiments, the inspection system 100 of the present disclosure may include a light source 180. The light source 180 may be configured to expose indications 50. For example, the light source 180 may allow the inspection system 100 to operate at night, or during cloudy or inclement weather. Further, the light source 180 may be operated to create favorable lighting conditions, such as incident lighting, to enable relatively high contrast inspection of indications 50. For example, the light source 180 may be directed at indications 50 at angles suitable to exaggerate the view of the indications 50 by the inspection system 100. The light source 180 may be disposed on the inspection system 100, such as on the observation system 102. Alternatively, the light source 180 may be disposed on the wind turbine 10, such as on the tower 12, the hub 20, or at any other suitable location on the wind turbine 10, or on the ground.

The light source 180, and various components therein, may further include and be communicatively coupled to a processor 182 for operating the light source 180. The communicative coupling of the light source 180 and the processor 182 may be through a physical coupling, such as through a wire or other conduit or umbilical cord, or may be a wireless coupling, such as through an infra-red, cellular, sonic, optical, or radio frequency based coupling. The processor 182 may be incorporated into a suitable control system (not shown), such as a handheld remote, a personal digital assistant, cellular telephone, a separate pendant controller, or a computer. The light source 180 may be operated manually through the processor 182 by a human operator, or may be partially or fully automated through the use of suitable programming logic incorporated into the processor 182.

It should be understood that the various processors may be separate processors, or may combined to form a processor or processors capable of performing various of the functions and inspection tasks required, by the inspection system 100.

The present disclosure is further directed to a method for inspecting a wind turbine 10 for indications 50. Thus, referring now to FIG. 4, the method may include, for example, the steps of providing an inspection system spaced from the wind turbine 200, appraising a component of the wind, turbine 202, and inspect a component of the wind turbine for indications 204. As discussed above, the wind turbine 10 of the present disclosure may include at least one rotor blade 22. In exemplary embodiments, the inspection system 100 may be operated to appraise the rotor blade 22, and may be operated to inspect at least one rotor blade 22 for indications 50.

For example, an inspection system 100 may be provided spaced from the wind turbine 10. As discussed above, the inspection system 100 may include an observation system 102 and an inspection device 104. The observation system 102 may be configured to appraise a component of the wind turbine 10, such as the rotor blade 22 or any other wind turbine 10 component, as discussed above.

The inspection system 100 of the present disclosure, such as the inspection device 104, may be operated to inspect the wind turbine 10, such as the rotor blade 22, or alternatively the tower 12 or other wind turbine 10 component, for indications 50. For example, in exemplary embodiments, operating the inspection system 100 to inspect the wind turbine 10 for indications 50 may comprise measuring the size of the indications 50. For example, the inspection device 104 of the inspection system 100 may include a measuring apparatus 130. The measuring apparatus 130 may be configured to measure the size of indications 50 detected by the inspection device 104, as discussed above. Further, measuring the size of the indications 50 may comprise, for example, providing at least one measuring apparatus 130 in the inspection system 104, calibrating the measuring apparatus 130, and utilizing the measuring apparatus 130 to measure the size of the indications 50, as discussed above.

In exemplary embodiments, operating the inspection system 100 to inspect the wind turbine 10 for indications 50 may comprise providing a real time image of the indications 50. For example, the inspection device 104 of the inspection system 100 may include a real time imaging apparatus 140. The real time imaging apparatus 140 may be configured to provide a real time image of the indications 50, as discussed above.

In exemplary embodiments, operating the inspection system 100 to inspect the wind turbine 10 for indications 50 may comprise rasterizing the wind turbine 10. For example, the inspection device 104 of the inspection system 100 may include a rasterization apparatus 150. The rasterization apparatus 150 may be configured to rasterize the wind turbine 10, such as the rotor blade 22, or alternatively the tower 12 or any other wind, turbine 10 component, as discussed above.

In exemplary embodiments, operating the inspection system 100 to inspect the wind turbine 10 for indications 50 may comprise capturing images of the indications 50 and enhancing the images of the indications 50. In further exemplary embodiments, operating the inspection system 100 to inspect the wind turbine 10 for indications 50 may comprise automatically detecting the indications 50. For example, the inspection device 104 of the inspection system 100 may include an imaging analysis apparatus 160. The imaging analysis apparatus 160 may be configured to capture images of indications 50 and enhance the images of the indications 50, and may further be configured to automatically detect the indications 50, as discussed above.

In exemplary embodiments, the method may include the step of providing an inspection fluid 170 to the wind turbine 10 component being inspected, such as to the rotor blade 22, as discussed above. Further, operating the inspection system 100 to inspect the wind turbine 10 for indications 50 may comprise detecting the inspection fluid 170. For example, the inspection device 104 of the inspection system 100 may include an imaging device 172 configured to record images of the wind turbine 10 component being inspected, such that the inspection fluid 170 seeping through the wind turbine 10 component is visible in the images, as discussed above.

In further exemplary embodiments, the method of the present disclosure may include various steps involving positioning the rotor blade 22 for inspection by the inspection system. For example, the method may include the step of rotating the rotor blade 22 such that the rotor blade 22 is approximately parallel to and proximate the tower 12. For example, the rotor blade 22 may be rotated about the axis of rotation until the rotor blade 22 is in a generally downward position. The rotor blade 22 may then be rotated and positioned such that it is approximately parallel to the tower 12. Thus, the inspection system 100 disposed on the wind turbine 10, such as on the tower 12, may be in an optimal position for inspecting the rotor blade 22.

The method may further include the step of rotating the nacelle 16 about the yaw axis 38. For example, while the inspection system 100 of the present disclosure may advantageously inspect a wind turbine 10 in a wide variety of environmental conditions, the use of incident light to inspect the wind turbine 10 may still be beneficial. Thus, if incident light is available, or if other desired conditions are present, the nacelle 16 may be rotated about the yaw axis 38 to optimally position the rotor blades 22 as desired.

The method may further include the step of rotating the rotor blade 22 about the pitch axis 34. For example, a rotor blade 22 of the present disclosure may include a pressure side, a suction side, a leading edge, and a trailing edge, as is known in the art. Each side and edge of the rotor blade 22 must be inspected. To be inspected by the inspection system 100, the side or edge must be in the line-of-sight of the inspection system 100. For example, when the rotor blade 22 is positioned such that the pressure side, leading edge, and trailing edge are in the line-of-sight of the inspection system 100, the suction side may not be analyzed. Thus, during the inspection of the rotor blade 22 by the inspection system 100, after analyzing portions of the rotor blade 22 that are in the line-of-sight of the inspection system 100, the rotor blade 22 may be rotated about the pitch axis 34 such that other portions of the rotor blade 22 are placed in the line-of-sight of the inspection system 100. The inspection system 100 may then continue to inspect the rotor blade 22.

In exemplary embodiments, operating the inspection system 100 to inspect the wind turbine 10 for indications 50 may comprise operating a light source 180 to expose indications 50. For example, the inspection system 100 may include a light source 180. The light source 180 may be configured to expose indications 50, as discussed above.

It should be understood that the inspection system and method of the present disclosure may be optimized for fast, efficient inspection of a wind turbine 10. For example, the inspection system and method, of the present disclosure may be utilized to quickly and efficiently inspect the various rotor blades 22 of a wind turbine 10. Additionally, it should be understood that the inspection system and method of the present disclosure eliminate or reduce human errors previously associated with the inspection of wind turbines 10. Further, it should be understood that the inspection system and method of the present disclosure can perform in a wide variety of environmental conditions.

This written description uses examples to disclose the invention, including the best mode, and also to enable any person skilled in the art to practice the invention, including making and using any devices or systems and performing any incorporated, methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for inspecting a wind turbine for indications, the method comprising:
    providing an inspection system spaced from the wind turbine, the inspection system comprising an observation system and an inspection device, the observation system including an appraisal device and an automated scanning device, wherein the automated scanning device is a reflection device, and wherein the reflection device is disposed adjacent the appraisal device, the appraisal device configured to provide an image of at least a portion of a rotor blade, wherein the reflection device is configured to rotate about at least two axes, shifting the image;
    appraising the rotor blade of the wind turbine; and,
    inspecting the rotor blade for indications.

2. The method of claim 1, further comprising rotating the rotor blade about a pitch axis.

3. The method of claim 1, wherein inspecting the rotor blade for indications comprises measuring the size of the indications.

4. The method of claim 1, wherein inspecting the rotor blade for indications comprises rasterizing the rotor blade.

5. The method of claim 1, wherein inspecting the rotor blade for indications comprises capturing images of the indications and enhancing the images of the indications.

6. The method of claim 5, wherein inspecting the rotor blade for indications includes automatically detecting the indications.

7. The method of claim 1, wherein inspecting the rotor blade for indications comprises providing a real time image of the indications.

8. The method of claim 1, further comprising the step of providing an inspection fluid to the rotor blade, and wherein inspecting the rotor blade for indications comprises detecting the inspection fluid.

9. An inspection system for inspecting a wind turbine for indications, the inspection system comprising:
    an observation system configured to appraise a rotor blade of the wind turbine, the observation system including an appraisal device and an automated scanning device, wherein the automated scanning device is a reflection device, and wherein the reflection device is disposed adjacent the appraisal device, the appraisal device configured to provide an image of at least a portion of the rotor blade, wherein the reflection device is configured to rotate about at least two axes, shifting the image; and,
    an inspection device connected to the observation system and configured to utilize the image to inspect the rotor blade for indications.

10. The inspection system of claim 9, wherein the appraisal device is stationary during appraisal of the rotor blade.

11. The inspection system of claim 9, the inspection device including a measuring apparatus configured to measure the size of the indications.

12. The inspection system of claim 9, the inspection device including a rasterization apparatus configured to rasterize the rotor blade.

13. The inspection system of claim 9, the inspection device including an imaging analysis apparatus configured to capture images of the indications and enhance the images of the indications.

14. The inspection system of claim 13, wherein the imaging analysis apparatus is further configured to automatically detect the indications.

15. The inspection system of claim 9, the inspection device including a real time imaging apparatus configured to provide a real time image of the indications.

16. The inspection system of claim 9, further comprising an inspection fluid, the inspection fluid configured to be added to the rotor blade to reveal indications, and wherein the inspection device is configured to detect the inspection fluid.

17. A method for inspecting a wind turbine for indications, the method comprising:
    providing an inspection system spaced from the wind turbine, the inspection system comprising an observation system and an inspection device, the observation system including an appraisal device and an automated scanning device, wherein the automated scanning device is a reflection device, and wherein the reflection device is disposed adjacent the appraisal device, the appraisal device configured to provide an image of at least a portion of a rotor blade, wherein the reflection device is configured to rotate about at least two axes, shifting the image;

providing an inspection fluid to an interior of the rotor blade;

appraising the rotor blade of the wind turbine; and, inspecting the rotor blade for indications, wherein inspecting the rotor blade for indications comprises detecting the inspection fluid on an exterior of the rotor blade.

18. An inspection system for inspecting a wind turbine for indications, the inspection system comprising:

an observation system configured to appraise a rotor blade of the wind turbine, the observation system including an appraisal device and an automated scanning device, wherein the automated scanning device is a reflection device, and wherein the reflection device is disposed adjacent the appraisal device, the appraisal device configured to provide an image of at least a portion of the rotor blade, wherein the reflection device is configured to rotate about at least two axes, shifting the image;

an inspection fluid, the inspection fluid configured to be added to an interior of the rotor blade to reveal indications; and, an inspection device connected to the observation system and configured to utilize the image to inspect the rotor blade for indications, the inspection device further configured to detect the inspection fluid on an exterior of the rotor blade.

* * * * *